(12) United States Patent
Bangalore Srinivas et al.

(10) Patent No.: US 11,318,610 B2
(45) Date of Patent: May 3, 2022

(54) ROBOTIC GRIPPER FOR WRITING AND OBJECT CREATION

(71) Applicant: Tata Consultancy Services Limited, Mumbai (IN)

(72) Inventors: Venkatesh Prasad Bangalore Srinivas, Bangalore (IN); Aniruddha Singhal, Noida (IN)

(73) Assignee: Tata Consultancy Services Limited, Mumbai (IN)

( * ) Notice: Subject to any disclaimer, the term of this patent is extended or adjusted under 35 U.S.C. 154(b) by 266 days.

(21) Appl. No.: 16/831,459

(22) Filed: Mar. 26, 2020

(65) Prior Publication Data

US 2021/0220992 A1    Jul. 22, 2021

(30) Foreign Application Priority Data

Jan. 22, 2020   (IN) .............................. 202021002873

(51) Int. Cl.
*B25J 9/16*   (2006.01)
*B25J 9/10*   (2006.01)
(Continued)

(52) U.S. Cl.
CPC ........... *B25J 9/1633* (2013.01); *B25J 9/1015* (2013.01); *B25J 9/1694* (2013.01);
(Continued)

(58) Field of Classification Search
CPC ...... B25J 9/1633; B25J 9/1015; B25J 9/1694; B25J 15/0028; B25J 15/0033; B25J 19/02;
(Continued)

(56) References Cited

U.S. PATENT DOCUMENTS 5,439,264 A *   8/1995   Margiottiello ............ B66C 1/54
                                                     294/94
7,901,170 B2 *  3/2011   Usui ..................... B25B 31/005
                                                     411/57.1
(Continued)

FOREIGN PATENT DOCUMENTS

CN   108466272   8/2018
CN   207724311   8/2018

*Primary Examiner* — Stephen A Vu
(74) *Attorney, Agent, or Firm* — Finnegan, Henderson, Farabow, Garrett & Dunner, LLP (57) ABSTRACT

This disclosure relates generally to a robotic gripper to hold a writing and object creation device for writing and object creation. The robotic gripper includes clamping unit, spring loaded slider unit and outer housing unit. The clamping unit include a finger collet with three or more flexible finger positions equispaced within 360 degrees with two areas of contact on each finger in front part for firm gripping. The spring loaded slider unit include a middle housing to transfer a force from the writing and object creation device to a force sensitive resistor (FSR). A micro actuator induces a required force to the writing and object creation device based on feedback from the force sensitive resistor. The middle housing includes a plunger shaft connected with a preload spring. The outer housing unit configured to hold a micro actuator, cotter pins, locator pins to the micro actuator, and a push pull key.

13 Claims, 11 Drawing Sheets

(51) Int. Cl.
*B25J 15/00* (2006.01)
*B25J 19/02* (2006.01)

(52) U.S. Cl.
CPC ....... *B25J 15/0028* (2013.01); *B25J 15/0033* (2013.01); *B25J 19/02* (2013.01)

(58) Field of Classification Search
CPC ....... B43L 13/028; B43L 13/022; B44D 3/00; G06F 3/13
See application file for complete search history.

(56) References Cited

U.S. PATENT DOCUMENTS

| | | |
|---|---|---|
| 9,415,520 B2 * | 8/2016 | Sanders ............... B25J 17/0275 |
| 9,613,180 B1 | 4/2017 | Hoffmann et al. |
| 10,766,148 B2 * | 9/2020 | Watanabe ................ B25J 15/10 |
| 2018/0236666 A1 * | 8/2018 | Mozeika ................ B25J 9/1612 |

* cited by examiner

ROBOTIC GRIPPER FOR WRITING AND OBJECT CREATION

PRIORITY CLAIM

This U.S. patent application claims priority under 35 U.S.C. § 119 to: India Application No. 202021002873, filed on Jan. 22, 2020.

TECHNICAL FIELD

This disclosure relates generally to gripper system, and, more particularly, to a robotic gripper for writing and object creation.

BACKGROUND

Drawing using pen or pencil, painting using paint brush is commonly known to us. But using a robot to be the creator is rare and for the robot to do the drawing work, firstly the robot needs a holder for the pen or pencil or brush to be able to rigidly hold the pen/pencil or brush. Secondly, the robot should be able to sense and control the pressure it applies on the surface on which it is drawing. Thirdly, because drawing and painting is majorly a recreational activity and has very limited business application, it requires fast frugal and cost-effective solution. Further, for application in writing and drawing, an end effector has to be very delicate in design, for example, it should be such that it does not tear the drawing sheet but also to be strong enough to leave a mark of ink on the paper. It requires precise pressure control to draw stroke of desired width and intensity. At present scenario, writing and drawing robot does not have a provision to grip variable sized pen and cannot provide desired pressure on the paper accurately.

There is conventional pen holder attached with a robotic arm used for art restoration which requires precise movement of a pen/brush on a very expensive piece of paper (i.e. a painting) or surface like a wall. A pressure of the pen on the paper/wall, width of the stroke and motion of the pen are not properly balanced in the conventional pen holder attached to the robotic arm. The robot arm is not able to take control over precision and pressure that the pen applies on the paper. Another application is wall painting which when done by a human requires long, uncomfortable and ergonomically prohibited postures. The robotic arms are designed completely with precision engineered parts which results in durability and reliability but gives less flexibility in changes to a gripping part. At the present scenario, there are no system having capability to hold a pen and brushes of different sizes and sensitive enough to draw strokes of desired width and intensity.

SUMMARY

Embodiments of the present disclosure present technological improvements as solutions to one or more of the above-mentioned technical problems recognized by the inventors in conventional systems. For example, in one embodiment, a robotic gripper to hold a writing and object creation device for writing and object creation is provided. The robotic gripper includes (a) a clamping unit configured to hold the writing and object creation device; (b) a spring loaded slider unit include a middle housing to transfer a force from the writing and object creation device to a force sensitive resistor (FSR); and (c) an outer housing unit include an outer housing which is configured to hold a micro actuator, a plurality of cotter pins, a plurality of locator pins to the micro actuator and a push pull key. In an embodiment, the clamping unit include a finger collet with three or more flexible finger positions equispaced within 360 degrees with two areas of contact on each finger in front part to grip firmly. In an embodiment, the middle housing includes a plunger shaft connected with a preload spring. In an embodiment, the plunger shaft mounted to the finger collet by a fastener. In an embodiment, the micro actuator induces a required force to the writing and object creation device based on feedback from the force sensitive resistor (FSR).

In an embodiment, each of the three or more flexible fingers may include one or more areas of contact. In an embodiment, each of the one or more areas of contact may include a gripping mechanism to hold a corresponding portion of the writing and object creation device. In an embodiment, the one or more areas of contact may include a first set of areas of contact and a second set areas of contact. In an embodiment, the first set of areas of contact may grip at anterior portion of the writing and object creation device to form a first area of contact. In an embodiment, the second set of areas of contact may grip at posterior side to form a second area of contact. In an embodiment, one or more serrations may be designed at each area of contact to provide multiple line contacts to distribute a gripping force across multiple points to grip firmly. In an embodiment, the one or more serrations may be configured to overcome an axial force on the writing and object creation device. In an embodiment, at end of the finger an entry feature may be provided for smooth entry and insertion for varying diameter range of the writing and object creation device. In an embodiment, a taper clamp may include a slot opening for the finger collet is coupled with an anti-rotation protrusion to enable sliding between the taper clamp and the finger collet for preventing anti-rotation. In an embodiment, the taper clamp may include a concave internal tapered surface is contacting with a taper surface to enable collapsing or expansion of the fingers of the finger collet to grip or release the writing and object creation device respectively.

In an embodiment, three or more additional flat screw may be equispaced in 360 degrees and passed through the plunger shaft until each of the additional flat screw touches surface of the writing and object creation device to resist flexing of the writing and object creation device. In an embodiment, three or more additional rounded screw may be equispaced in 360 degrees and passed through the outer housing until each of the additional rounded screw touches surface of the writing and object creation device to resist flexing of the writing and object creation device. In an embodiment, the plunger shaft may include a pop out spring with an end plate integral at one end of spring.

In an embodiment, the pop out spring include a force spring with free length and minimal solid length to enable seating of the writing and object creation device. In an embodiment, the plunger shaft may be coupled with the middle housing by an anti-rotation diamond pin to prevent a rotation. In an embodiment, the anti-rotation diamond pin is in a close proximity to center axis of the robot gripper to reduce overall size. In an embodiment, the plunger shaft and the middle housing may be coupled to create a space for reducing abrupt shock loads while the writing or the objection creation operation is performed by the writing and object creation device. In an embodiment, a spring housing may be sandwiched between the preload spring and the force sensitive resistor (FSR) to detect variation in axial force of the writing and object creation device and providing feedback to the micro actuator. In an embodiment, the push pull key may be mounted to the middle housing and coupled with a key slot of the outer housing to ensure a sliding movement between the outer housing unit and the middle housing. In an embodiment, the push pull key may be coupled between the middle housing and the micro actuator to induce a required force without moving a robotic arm in perpendicular direction for the writing or the objection creation operation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiment provides a gripper fitted with a robotic arm for multi-functional tasks but not limited to drawing, painting, and writing. The gripper includes spring & actuator to generate precise force control, manufactured according to the pen and paper used. The gripper can hold different types but not limited to a pen, a pencil, a painting brush with varying range of a diameter. The gripper is configured to create fine art on different mediums ranging from very thin paper to canvas and also walls.

Referring now to the drawings, and more particularly to FIGS. 1 through 7, where similar reference characters denote corresponding features consistently throughout the figures, there are shown preferred embodiments and these embodiments are described in the context of the following exemplary system and/or method.

Reference numerals of one or more components of a robotic gripper as depicted in the FIGS. 1 to 7 are as listed below:

| S. NO | NAME OF COMPONENT | REFERENCE NUMERALS |
|---|---|---|
| 1 | Robotic gripper | 100 |
| 2 | Micro actuator | 102 |
| 3 | Outer housing | 104 |
| 4 | Middle housing | 106 |
| 5 | Lock nut | 108 |
| 6 | Pull nut | 110 |
| 7 | Push pull nut | 112 |
| 8 | Finger collet | 114 |
| 9 | Holes to mount gripper to Robot | 116A-N |
| 10 | Plurality of Cotter Pins | 118A-B |
| 11 | Single slot opening for pen extraction | 120 |
| 12 | Locating Pins | 122A-B |
| 13 | Clamping unit | 124 |
| 14 | spring loaded slider unit | 126 |
| 15 | Outer housing unit | 128 |
| 16 | Fasteners | 202 |
| 17 | Push pull key | 204 |
| 18 | Force sensitive Resistor (FSR) | 206 |
| 19 | Spacer | 208 |
| 20 | Rounded Screw | 210 |
| 21 | Flat screw | 212 |
| 22 | Spring housing | 214 |
| 23 | Plunger Shaft | 216 |
| 24 | Preload Spring | 218 |
| 25 | Pop Out Spring | 220 |
| 26 | Bush | 222 |
| 27 | Taper Clamp | 224 |
| 28 | Anti-rotation Diamond pin | 226 |
| 29 | Writing device | 228 |
| 30 | Air Vent holes | 230 |
| 31 | Key slot | 232 |
| 32 | End plate | 234 |
| 33 | Areas of contact | 236A-N |
| 34 | Multiple line contact serrations | 302 |
| 35 | Entry Feature | 304 |
| 36 | Precession hole & shaft for sliding | 306 |
| 37 | anti-rotation protrusion | 308 |
| 38 | Taper surface | 310 |
| 39 | Concave internal Tapered surface | 402 |
| 40 | Slot opening for Finger collet | 404 |
| 41 | Cutout | 502 |
| 42 | Holes for press fitting Diamond pin | 504 |
| 43 | Cutout to insert the FSR sensor | 506 |
| 44 | Long relief cutouts for rounded screw | 508 |
| 45 | Sliding Hole of the middle housing | 510 |
| 46 | Holes for press fitting precision bush | 512 |
| 47 | Paper/Sketching Board | 702 |
| 48 | Robotic Arm | 704 |

Figure 1A:
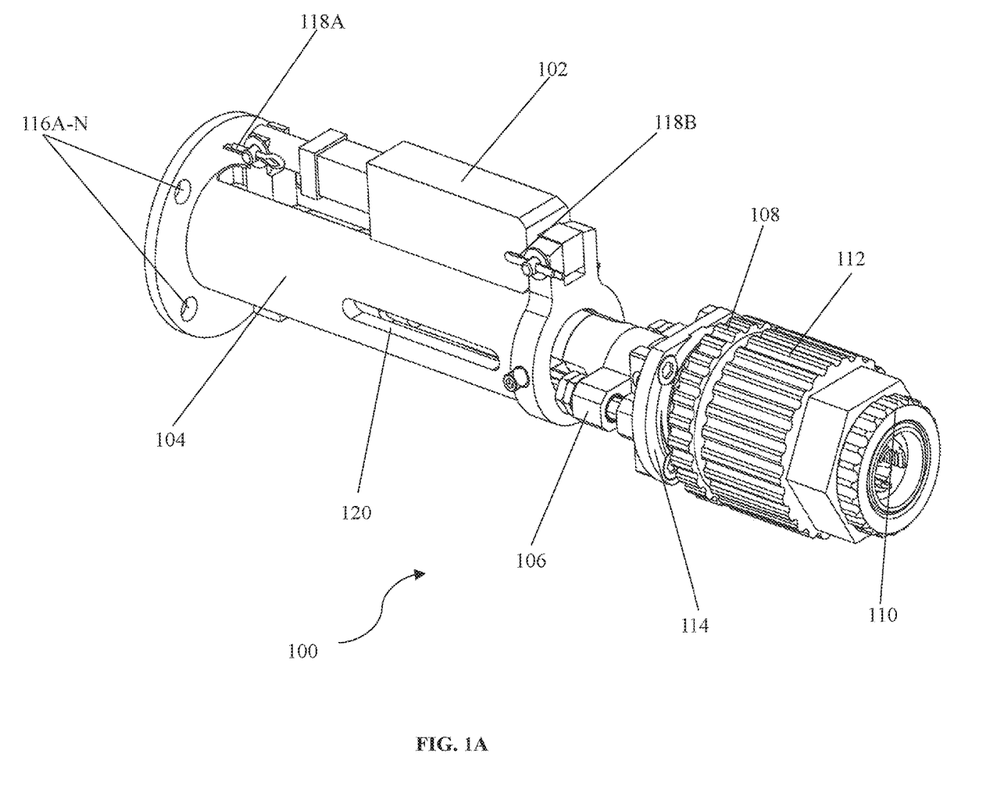
FIGS. 1A, 1B, and 1C illustrates an isometric view of a robotic gripper to hold a writing and object creation device for writing and object creation, according to some embodiments of the present disclosure.
Figure 1B:
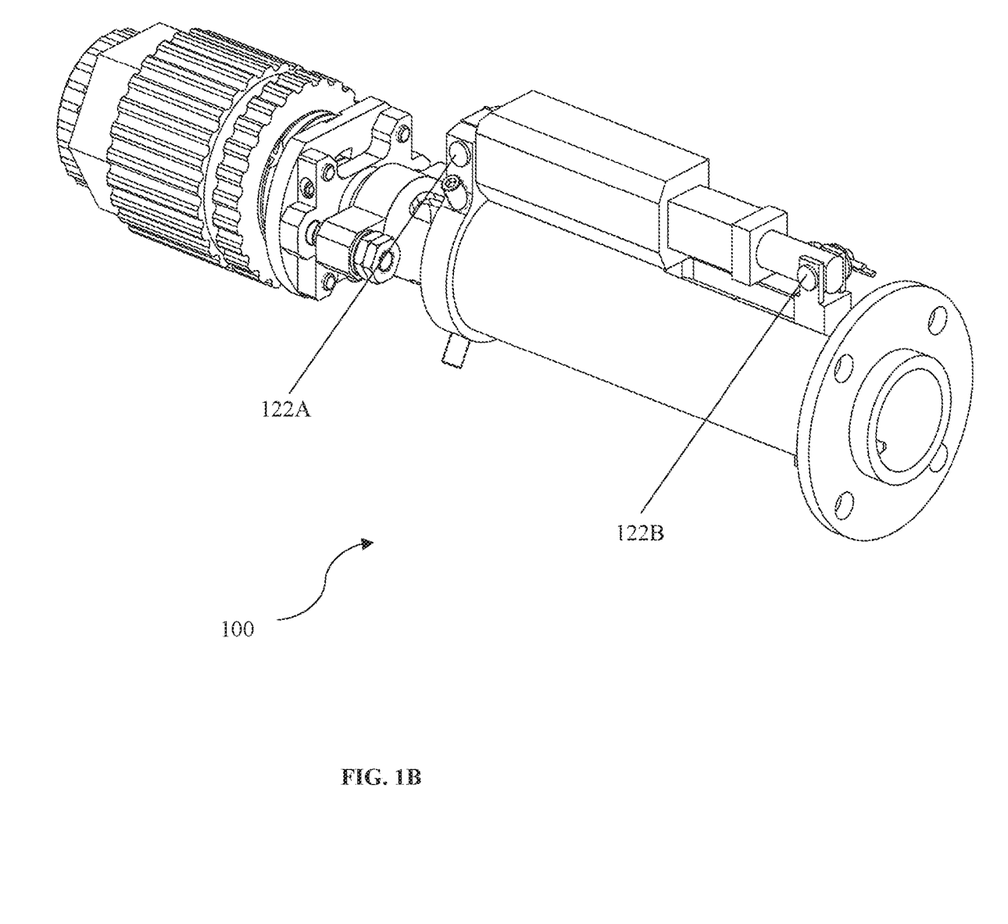
Figure 1C:
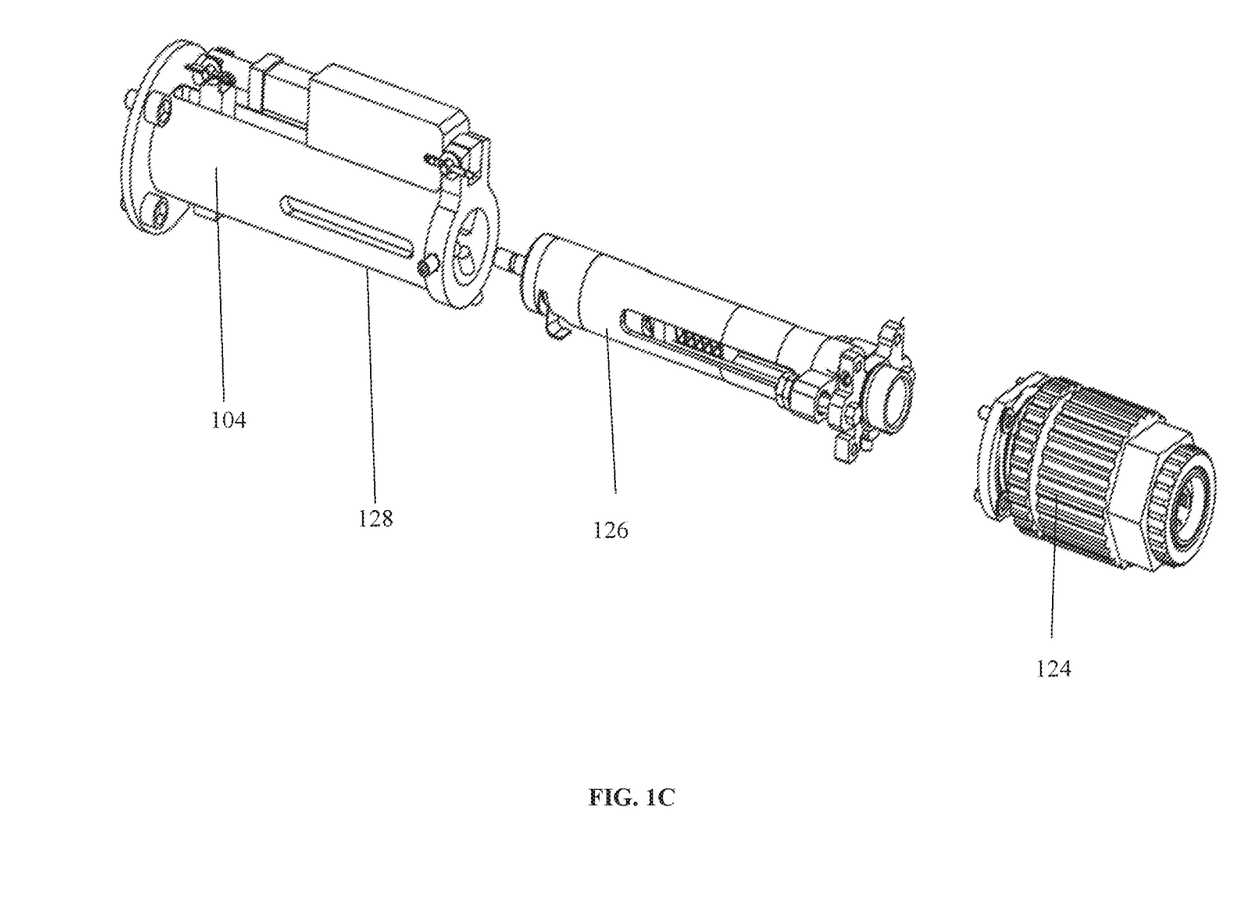

FIGS. 1A, 1B, and 1C illustrates an isometric view of a robotic gripper 100 to hold a writing and object creation device 228 for writing and object creation, according to some embodiments of the present disclosure. The robotic gripper 100 includes (a) a clamping unit 124, (b) a spring loaded slider unit 126, and (c) an outer housing unit 128. The robotic gripper 100 is configured with a micro actuator 102, an outer housing 104, a middle housing 106, a lock nut 108, a pull nut 110, a push pull nut 112, a finger collet 114, a holes to mount gripper to robot 116A-N, a plurality of cotter pins 118A-B, a single slot opening for pen extraction 120, a locating pins 122A-B. The robotic gripper 100 is configured to hold one or more different types of a writing device 228 or an object creation device 228 (as shown in FIG. 2B) with varying range of diameters. For example, the writing device 228 or the object creation device 228 are but not limited to such as a pen, a pencil, a painting brush respectively. The robotic gripper 100 include a spring housing 214 (as shown in FIG. 2B) and the micro actuator 102 to generate precise force control, manufactured according to the pen and the paper used. In an embodiment, the robotic gripper 100 is configured to create fine art on one or more mediums ranging from a very thin paper to a canvas and also wall. In an embodiment, range of length of writing equipment are ranging from 50 mm to 200 mm.

Figure 2A:
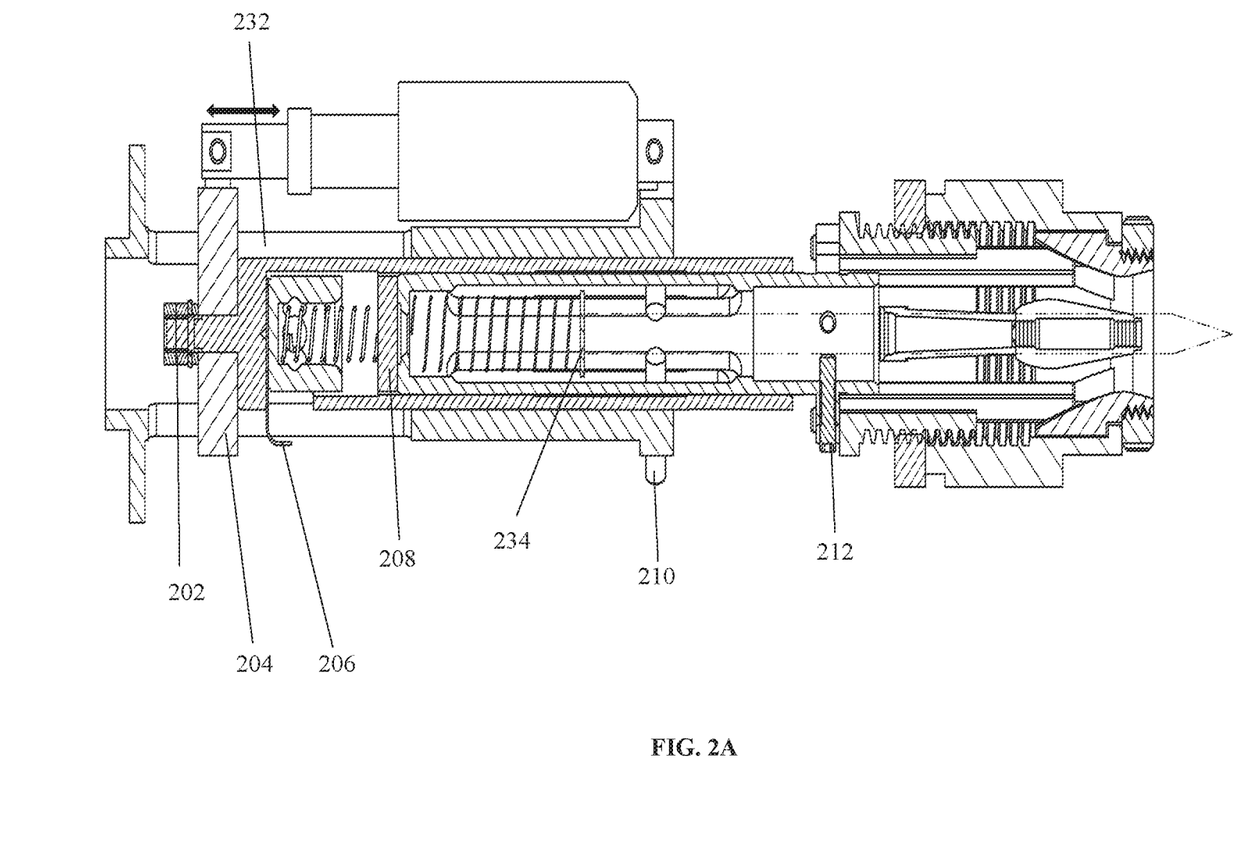
FIG. 2A is a front sectional view of the robotic gripper, according to some embodiments of the present disclosure.
Figure 2B:
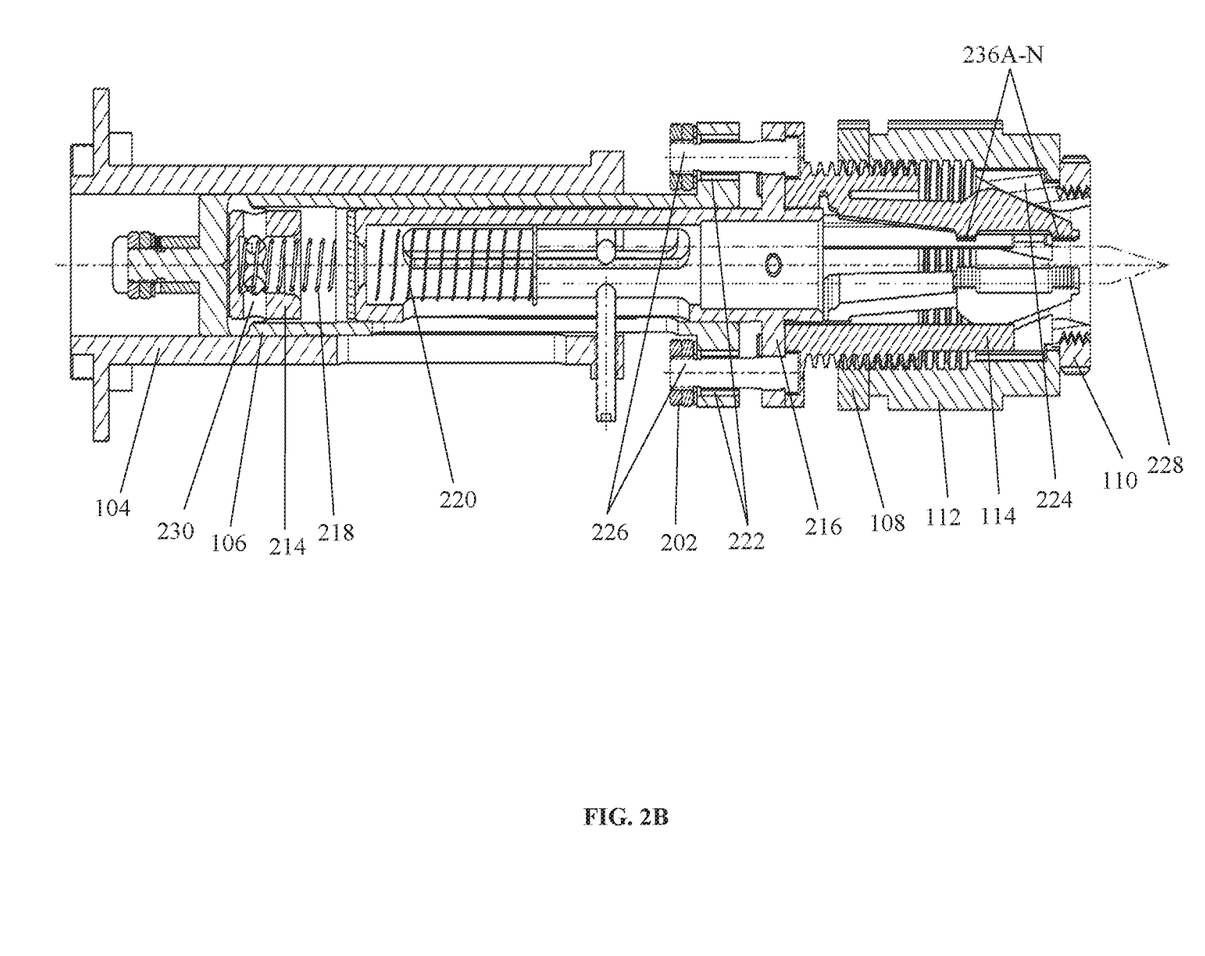
FIG. 2B is a top sectional view of the robotic gripper, according to some embodiments of the present disclosure.

FIG. 2A and FIG. 2B is a front sectional view and top sectional view of the robotic gripper 100 respectively, according to some embodiments of the present disclosure. A plunger shaft 216 is mounted to the finger collet 114 with few screws. A pop out spring 220 inside the plunger shaft 216 with a flat plate integral at one end of spring is a very light force spring with long free length and minimal solid length to enable seating of a long pen and easy pop out (i.e., removal of pen) during unclamping of the pen after usage. The plunger shaft 216 include three slot openings wide and long minimum enough so that three rounded screws 210 passing through the openings do not rub on the sides of the three slot openings. The plunger shaft 216 the slots are made extra-long than minimum required to reduce weight of plunger housing.

Figure 5A:
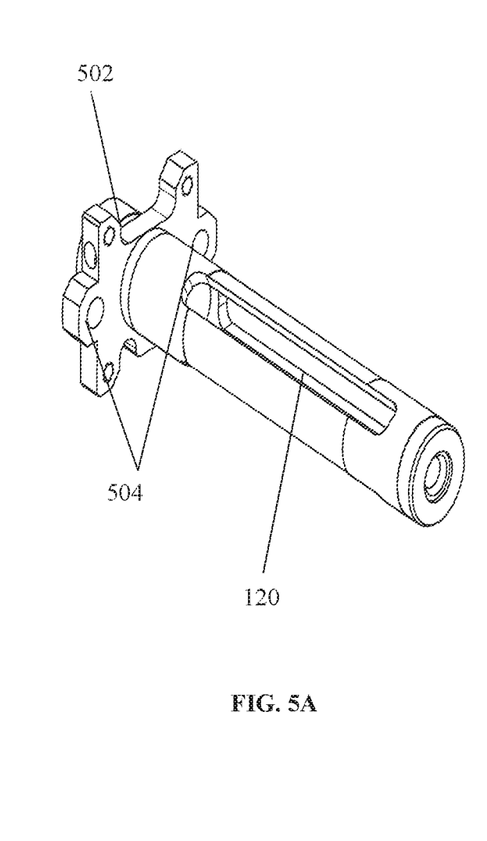
FIG. 5A is an isometric view of a plunger shaft of the robotic gripper, according to some embodiments of the present disclosure.

The plunger shaft 216 include a step face for securely housing the two diamond pins in two holes. The step face includes a number of cutouts 502 (as shown in FIG. 5A) including slots, and larger chamfers all for weight reduction. In an embodiment, total weight of all gripping elements the finger collet 114, a taper clamp 224, the push-pull locknut 112, the pull nut 110, locknut, a flat screw 212, the plunger shaft 216, a diamond pin, the pop out spring 220 and should be having least self-weight that it would not break the nib of pen or lead of pencil based on which appropriate materials are chosen.

Figure 3:
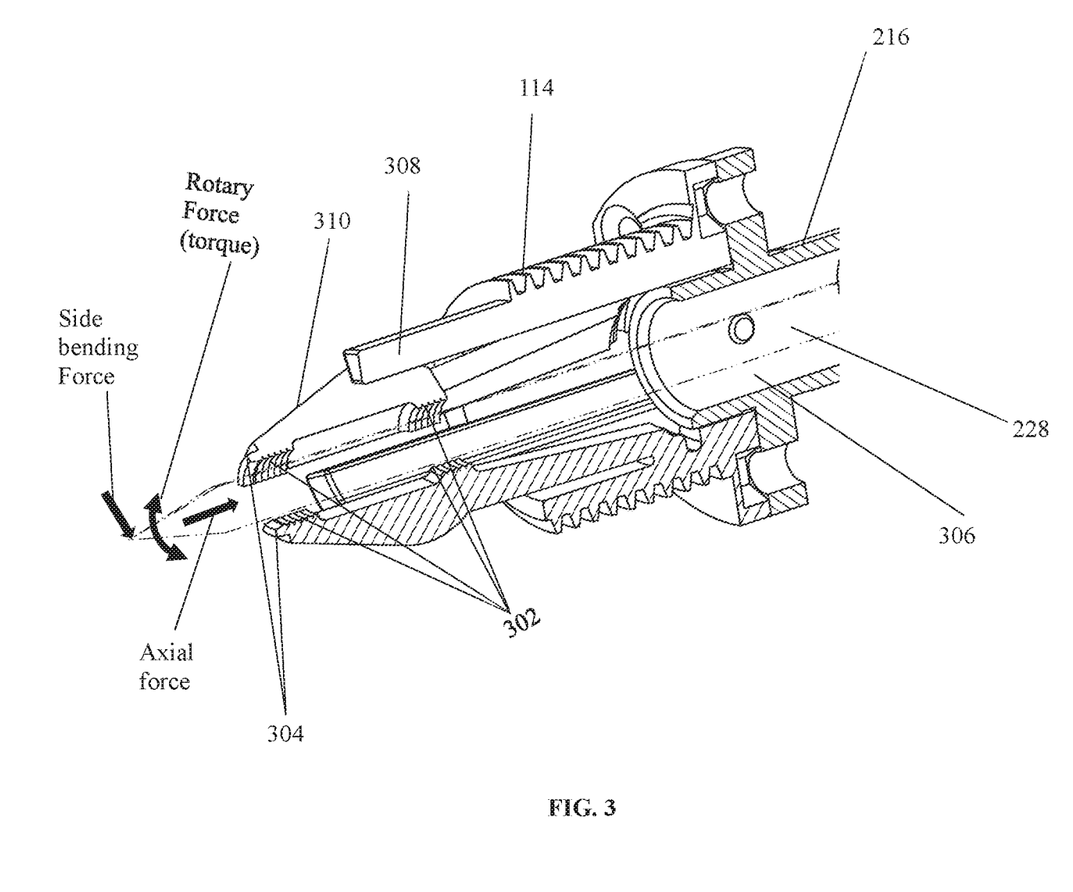
FIG. 3 is a sectional view of a clamping unit of the robotic gripper to hold a writing and object creation device, according to some embodiments of the present disclosure.

FIG. 3 is a sectional view of the clamping unit 124 of the robotic gripper 100 to hold the writing and object creation device 228, according to some embodiments of the present disclosure. The clamping unit 124 is also referred as the writing device gripping unit or the object creation device gripping unit. For example, the writing device gripping unit is a pen gripping unit or a paint brush gripping unit respectively. The clamping unit 124 is configured to hold the writing and object creation device 228. The clamping unit 124 include the finger collet 114 with three or more flexible finger positions equispaced within 360 degrees with one or more areas of contact 236A-N (e.g., two areas of contact) on each finger in front part for firm gripping. In an embodiment, each of the one or more areas of contact 236A-N include a gripping mechanism to hold a corresponding portion of the writing and object creation device 228.

For example, the three or more flexible fingers include six or more areas of contact with a surface of the writing and object creation device 228. In an embodiment, the one or more areas of contact 236A-N include a first set of areas of contact and a second set areas of contact. In an embodiment, the first set of areas of contact (e.g., a first three or more areas of contact) grips at anterior portion of the writing and object creation device 228 to form a first area of contact. In an embodiment, the second set of areas of contact (e.g., first three or more areas of contact) grips at posterior side to form a second area of contact.

Accordingly, all fingers include six or more areas of contact with surface of the pen. The six or more areas of contact is configured only if the finger part can easily bend according to a diameter of the pen. For example, this configuration is ensured by way three cantilevering arms are thinly and optimally designed. In an embodiment, the cantilevering arms break if the configuration is too thin and the cantilevering arms does not flex if this configuration is too thick. In an embodiment, the cantilevering arm is long enough to ensure proper flexing to required range, since if too short which leads to breakage due to fatigue. In an embodiment, expansion and contractions is attained to enable cover to hold minimum to maximum size of the writing and object creation devices. In an embodiment, one or more serrations 302 designed at each area of contact to provide multiple line contacts to distribute a gripping force across multiple points for firm gripping. In an embodiment, the one or more serrations 302 are configured to overcome an axial force on the writing and object creation device 228. In an embodiment, an entry feature 304 which is small at end of the finger to provide smooth entry and insertion for varying diameter range of the writing device 228 and e.g., for insertion of the pen into the writing device clamping unit.

Figure 4:
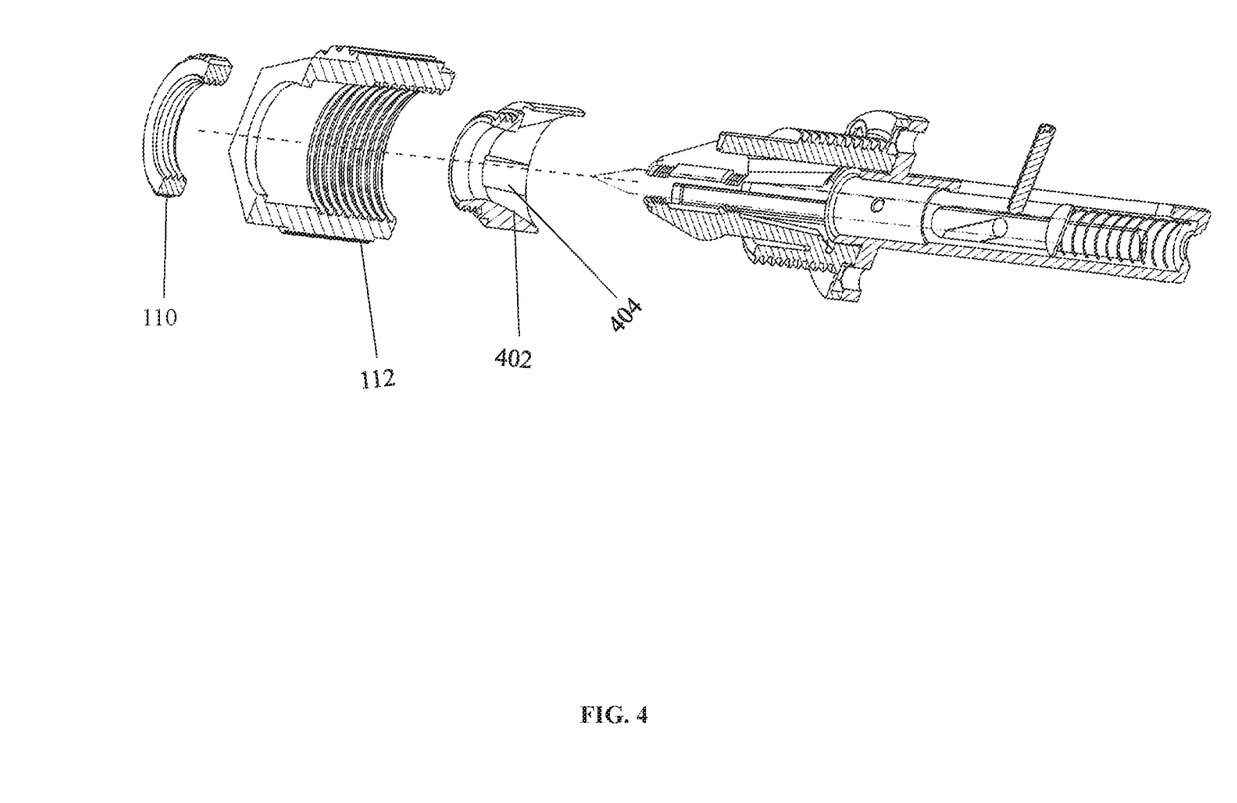
FIG. 4 is an exploded view illustrating sections of the robotic gripper, according to some embodiments of the present disclosure.

FIG. 4 is an exploded view illustrating sections of the robotic gripper 100, according to some embodiments of the present disclosure. In an embodiment, on outer diameter of each front part of the fingers, there are three tapered surfaces such that a taper angle creating a larger diameter towards the backside. The taper clamp 224 include a concave internal taper surface 402 in accordance with the taper angle of the fingers in the finger collet 114. In an embodiment, the taper clamp 224 include the concave internal tapered surface 402 is contacting with a taper surface 406 to enable collapsing or expansion of the fingers of the finger collet 114 to grip or release the writing and object creation device 228 respectively.

The function of the taper clamp 224 is to slide front or back side such that both the taper surfaces contact with each other in a circular curve contact. In another embodiment, if there was no concave surface instead of straight taper, then for the varying diameters of the pen have a three zone contacts instead of the six zone contacts. The taper clamp 224 includes the outer diameter which include a minimum & sliding clearance fit with the internal diameter of the push pull nut 112. For example, when the pen touches the paper a force is experienced from the paper while writing causes the pen to move around if the clearance is more. The taper clamp 224 include an external thread to fasten the pull locknut 110. The pull locknut 110 is used to pull the taper clamp 224 towards the front side to expand back the collapsed fingers for un-gripping the pen. The push pull lock-nut 112 pushes the taper clamp 224 towards the back side to collapse the fingers to grip the pen.

The taper clamp 224 can rotate along with sliding, while pushing or pulling is performed by screwing or unscrewing the push pull locknut 112. To prevent this rotation and to ensure only sliding, one or more features are added. Similarly, there are three slots or openings 404 in the taper clamp 224 to allow the three protrusions to pass through as taper clamp slides. In an embodiment, the push pull nut 112 from loosening there is an additional lock nut 108. In an embodiment, the taper clamp 224 include a slot opening 404 for the finger collet 114 is coupled with an anti-rotation protrusion 308 to enable sliding between the taper clamp 224 and the finger collet 114 for preventing anti-rotation. In an embodiment, three or more additional flat screw 212 are equispaced in 360 degrees and passed through the plunger shaft 216 until each of the flat screw 212 touches surface of the writing and object creation device 228 to resist flexing of the writing and object creation device 228. In an embodiment, three or more additional rounded screw 210 are equispaced in 360 degrees and passed through the outer housing 104 until each of the rounded screw 210 touches surface of the writing and object creation device 228 to resist flexing of the writing and object creation device 228.

FIG. 5A is an isometric view of the plunger shaft 216 of the robotic gripper 100, according to some embodiments of the present disclosure. The spring loaded slider unit 126 of the robotic gripper 100 in which long outer diameter of the plunger shaft 216 include two step diameters of equal size which are larger than rest area. In an embodiment, the spring loaded slider unit 126 include a middle housing 106 to transfer a force from the writing and object creation device 228 to a force sensitive resistor (FSR) 206. The middle housing 106 include the plunger shaft 216 connected with a preload spring 218. The plunger shaft 216 mounted to the finger collet 114 by a fastener 202. In an embodiment, the plunger shaft 216 include the pop out spring 220 with an end plate 234 integral at one end of spring. The pop out spring 220 is a very light force spring with long free length and minimal solid length to enable seating of a long writing device. In an embodiment, a spring housing 214 is sandwiched between the preload spring 218 and the force sensitive resistor (FSR) 206 to detect variation in the axial force of the writing and object creation device 228 and providing feedback to the micro actuator 102.

In an embodiment, the long outer diameter is a mating diameter with a hole 510 of the middle housing 106. In an embodiment, there is relative sliding with the two parts and sliding to be precise and repeatable, the fit is to be close clearance fit and the surfaces are to have a mirror like surface finish. The mirror finish surfaces are also required to be made hard to prevent any damages or dents during operation. The mirror finish in combination of hardness induced in the material and low sliding clearing fit and long shaft all together cause less frictional contact between mating contact. The low frictional contact is right that when the nib or lead of pencil experiences a side force as it writes, the impact of this instead of increasing the friction from the sides not at all resist the sliding. The side-ward resistance includes least impact of sliding. In an embodiment, when writing with wide tipped pens meaning pen having large line thickness, during drawing operation the pen can also be subject to torque or slight rotational effect about the pen axis which may result in non-uniform or low quality writing.

In an embodiment, preventing the rotation of the gripping elements and have only sliding action, an anti-rotation diamond pin 226 is added on one side. In an embodiment, the anti-rotation pin 226 is in a close proximity to center axis for reducing the overall size, there could be some imbalance forces adding to resistance. The imbalance is prevented by addition of a second diamond pin directly 180-degree opposite to the first diamond pin 226. In an embodiment, the plunger shaft 216 is coupled with the middle housing 106 by the anti-rotation diamond pin 226 to prevent rotation. In an embodiment, the plunger shaft 216 and the middle housing 106 are coupled to create a space for reducing sudden shock loads while the writing and object creation device 228 performs the writing or the objection creation operation.

Figure 5B:
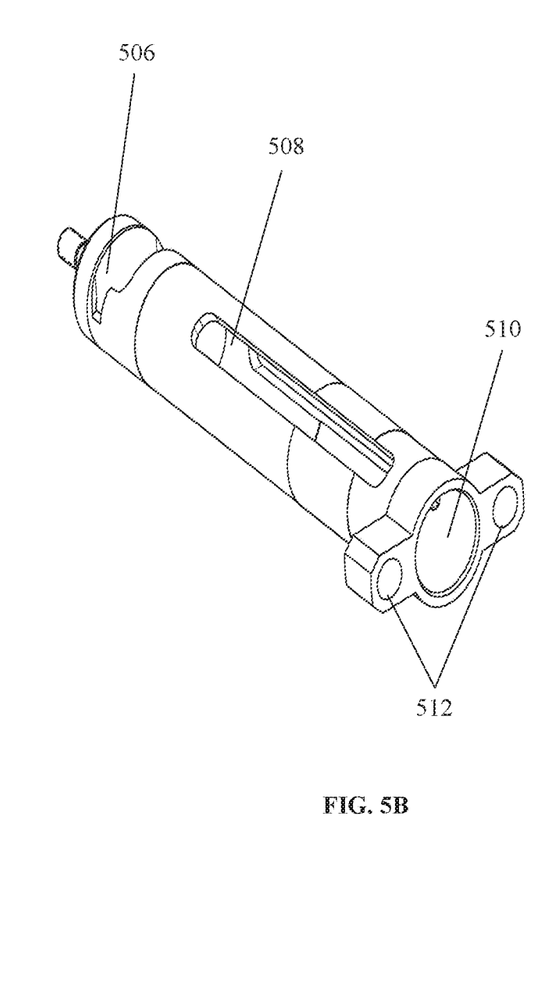
FIG. 5B is an isometric view of a middle housing of the robotic gripper, according to some embodiments of the present disclosure.

FIG. 5B is an isometric view of the middle housing 106 of the robotic gripper 100, according to some embodiments of the present disclosure. The robotic gripper 100 include the middle housing 106. The middle housing is designed to include a sliding hole 510 of the middle housing 106 to mount the plunger shaft 216 such that the middle housing 106 slides with respect to the plunger shaft 216. The middle housing 106 is configured to hold the force sensitive resistor (FSR) 206 and the plunger shaft 216. The middle housing 106 is also configured to hold the preload spring 218 which is applying a spring force to the force sensitive resistor (FSR) 206. The spring force is transmitted through an intermediate spring housing 214 which is placed in between the preload spring 218 and the force sensitive resistor (FSR) 206. The middle housing 106 is designed to have a cutout 506 to insert FSR sensor 206 and also long relief cutouts 508 for the rounded screw 210.

Figure 5C:
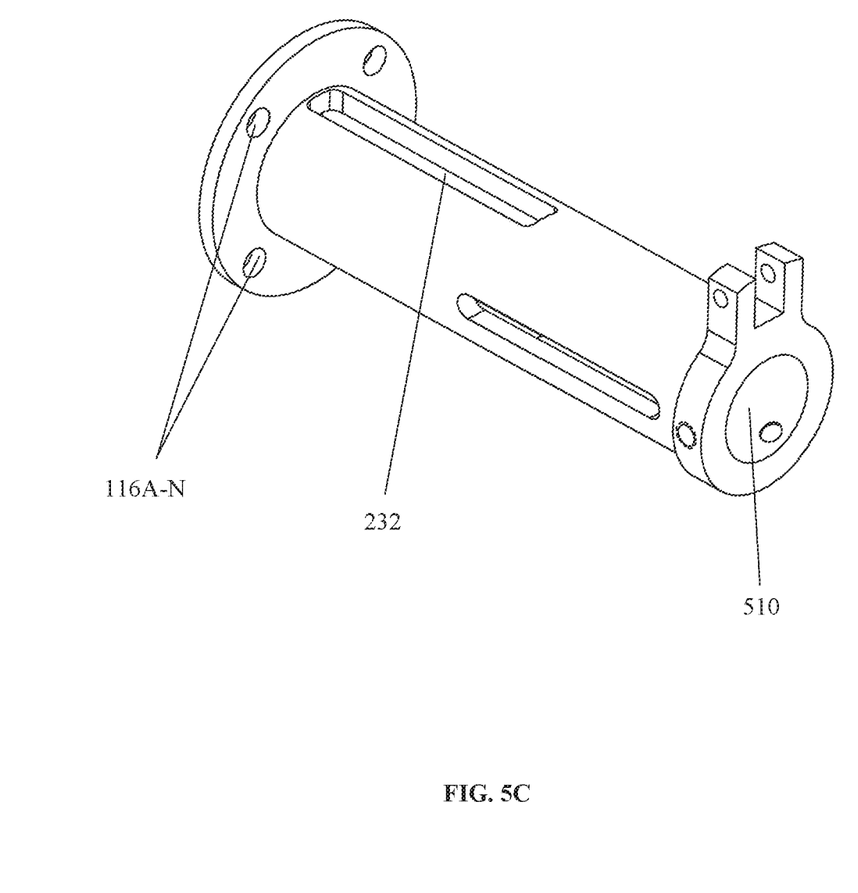
FIG. 5C is an isometric view of an outer housing of the robotic gripper, according to some embodiments of the present disclosure.

FIG. 5C is an isometric view of the outer housing 104 of the robotic gripper 100, according to some embodiments of the present disclosure. The robotic gripper 100 include the outer housing 104, the micro actuator 102, pins to hold actuator, and a push pull key 204. The outer housing (104) of the outer housing unit 128 is configured to hold a micro actuator 102, the plurality of cotter pins 118A-B, the plurality of locator pins 122A-B to the micro actuator 102 and a push pull key 204. The micro actuator 102 induces a required force to the writing and object creation device 228 based on feedback from the force sensitive resistor (FSR) 206.

In an embodiment, the push pull key 204 mounted to the middle housing 106 and coupled with a key slot 232 of the outer housing 104 to ensure a sliding movement between the outer housing 104 and the middle housing 106. In an embodiment, the push pull key 204 is coupled between the middle housing 106 and the micro actuator 102 to induce a required force without moving a robotic arm 704 in perpendicular direction for the writing or the objection creation operation. A long outer diameter of the middle housing 106 include two step diameters of equal size which are larger than rest area. In an embodiment, the long outer diameter is a mating diameter with a hole of the outer housing 104. In an embodiment, there is a relative sliding with the two parts and sliding to be precise and repeatable, the fit is to be close clearance fit and the surfaces are to have a mirror like surface finish. The mirror finish surfaces are also required to be made hard to prevent any damages or dents during operation. The mirror finish in combination of hardness induced in the material and low sliding clearing fit and long shaft all together cause less frictional contact between mating contact.

The low frictional contact is right that when the nib or lead of pencil experiences a side force as it writes, impact of this instead of increasing the friction from the sides not at all resist the sliding. The side-ward resistance includes least impact of sliding. In an embodiment, when a plunger shaft 216 moves couple of millimeters and experiences a higher axial force than required, this is when the micro actuator 102 actuates and moves the middle housing 106 forward or back so that a preload spring 218 collapses or expands thereby spring regains original force. In an embodiment, additionally when required to apply more force at certain areas the micro actuator 102 moves to generate more force. For example, when force is not criteria and only stroke of movement is important in cases of the paint brush and then the micro actuator 102 move a total of 20 mm causing the middle housing 106 to move thereby causing gripping elements to move.

Figure 6:
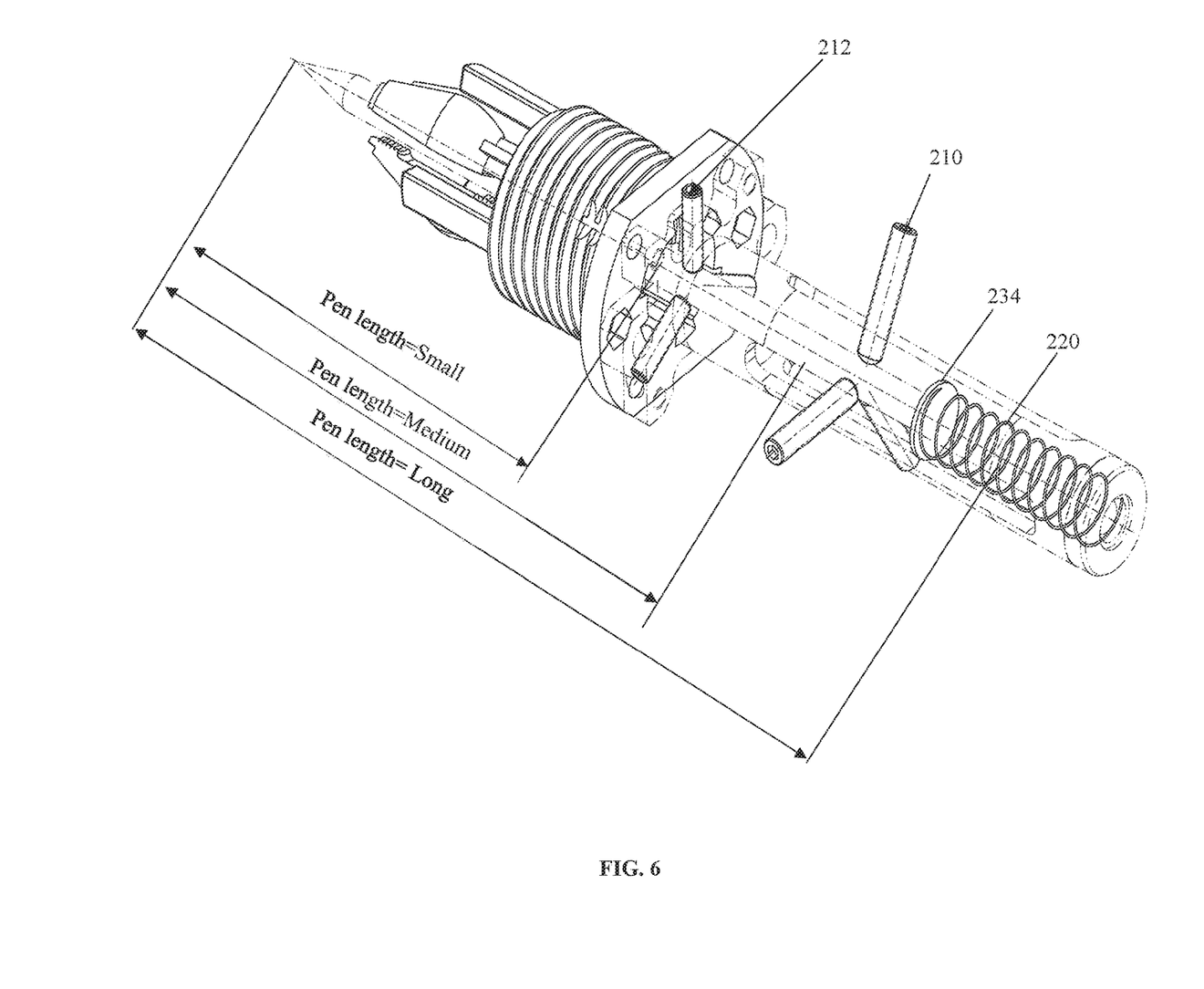
FIG. 6 is an isometric view of the robotic gripper holding an exemplary pen with varied lengths, according to some embodiments of the present disclosure.

FIG. 6 is an isometric view of the robotic gripper 100 holding an exemplary pen with varied lengths, according to some embodiments of the present disclosure. In an exemplary embodiment, if the pen length is small, the six-zone contact is enough for firm gripping. If pen length is medium then might be that depending on the axial force the pen is given to experience which is in turn depending on actuator force, then there is chance that medium long pen could bend against the direction of the writing direction and cause the drawing to be crooked. To prevent this flexing, three additional the flat screws 212 are made to pass through the plunger shaft 216 equispaced within 360 degrees until each of the flat screw 212 just barely touches the pen surface totally at the three areas of contact and totally prevents flexing of the pen.

If the pen length is long, then the same three flat screws 212 as explained above are used for preventing flexing of pen. In addition to this the rounded screws 210 are additionally used further prevent any even small flexing. These rounded screws are made bearing surface to reduce friction. The surface is a pointed contact since the screw end is rounded. The bearing material and point contact is required since there is relative motion between the pen and rounded screw and friction should be least.

Figure 7:
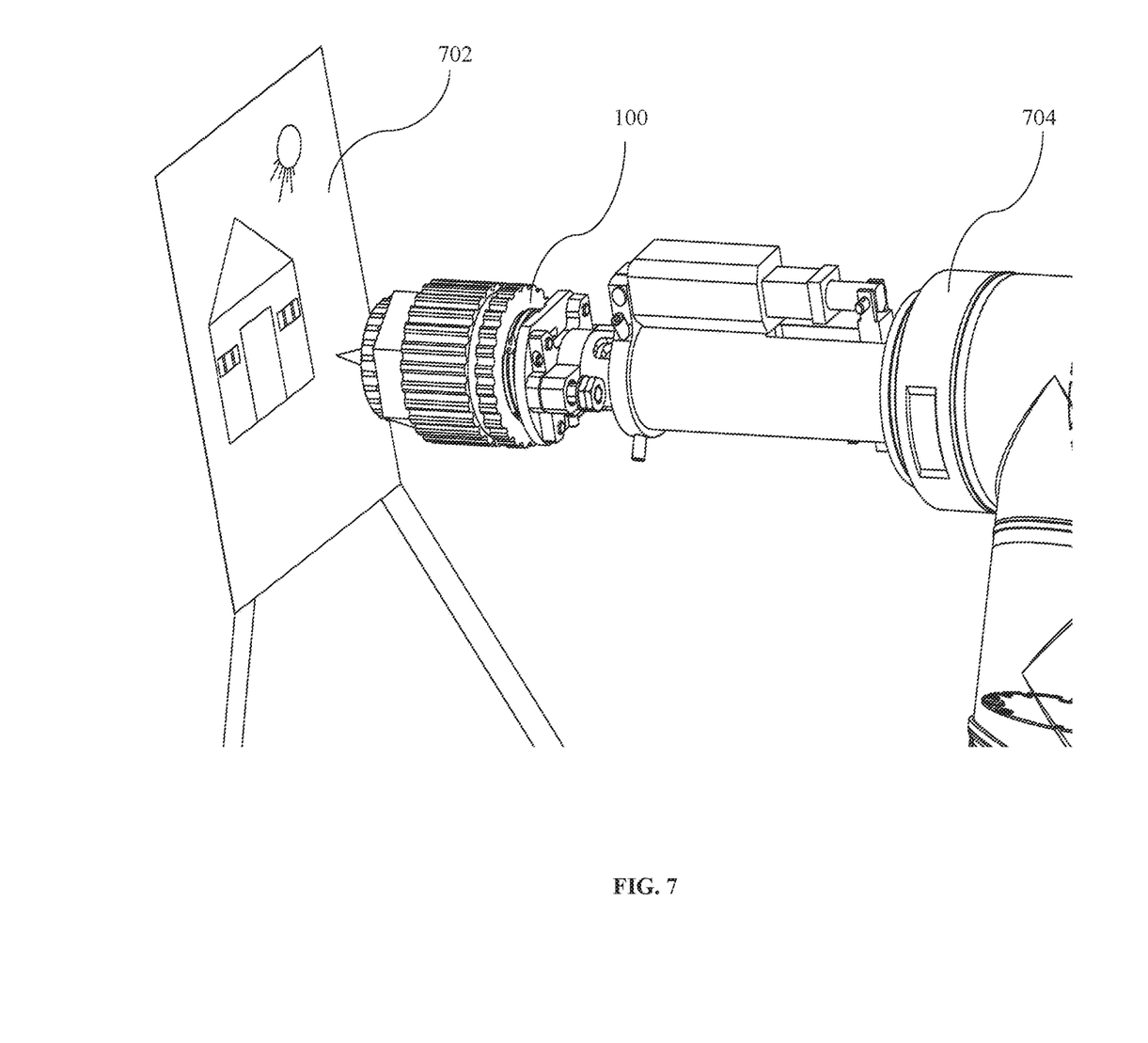
FIG. 7 is an isometric view illustrating an exemplary application of a robotic arm mechanically connected with the robotic gripper which holds the pen to create an object, according to some embodiments of the present disclosure.

FIG. 7 is an isometric view illustrating an exemplary application of a robotic arm 704 mechanically connected with the robotic gripper 100 which holds the pen to create an object, according to some embodiments of the present disclosure. For example, the robotic gripper 100 is mechanically connected with the robotic arm 704 which holds the pen to create an object on a paper/sketching board 702.

The robotic gripper 100 include an option of an auto preload adjustment. A mechanism to have pen/pencil to experience more or less a constant force between the contact point of the pen/pencil and the paper. If the pen or pencil experiences higher force i.e., 1.5 times or more, then it needs to automatically regain the same force to avoid breakage of lead in pencil or nib in the pen. The robotic gripper 100 include a provision for auto adjustment mechanism for pen/pencil to experience a decent constant force (i.e., a less significant variation). Controlled preload adjustment: In some application the writing device needs to exert extra force in some areas and also the mechanism to push or pull the writing device towards or away from the paper. In another application, a paint brush in which a force based stroke control is not required, whereas a position based force control is required i.e. the paint brush does not give a force feedback at all, since the paint brush include flexible hairs for painting. The stroke depth is programmed to large values for giving brush more contact or less contact with the paper. For example, the micro actuator 102 chosen include a stroke of up to 20 mm.

The embodiments of present disclosure herein address unresolved problem of designing a writing and drawing robot which can hold multiple pen/brushes, include force feedback, can apply required amount of force precisely and include anti-skid & anti-rotation mechanism. The embodiments thus provide a design which utilize a combination of both electro-mechanical feedback and spring mechanism. The robotic gripper design, which is a solution for multi-functional tasks like drawing, painting, and writing. In an embodiment, the robotic gripper is designed to work for pen, pencil, sketch pen, paint brush and are capable to hold ranging from a diameter of 5 mm to 12 mm and further extended-able to larger diameters up to 30 mm, have force feedback, can apply required amount of force precisely and also include anti-skid & anti-rotation mechanism.

The sensor for force estimation which gives feedback to the robotic arm and resulting in strokes of precise width can be drawn. The robotic gripper is used to create fine art on different mediums ranging from very thin paper to canvas and also walls. The gripper with the robotic arm can be combined with advanced vision technology to help in restoration of historical artworks, which requires much effort by highly skilled artists. The robotic gripper is used to create Murals for a larger group of consumers and allows consumers to have beautiful paintings drawn on the walls of their homes and workplaces. The robotic gripper can further be designed to have a clamping adapter which can be automatically changed by the robot without human involvement so that the robot can draw a painting using different set of brushes autonomously.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A robotic gripper (100) to hold a writing and object creation device (228) for writing and object creation, comprising:
   (a) a clamping unit (124) configured to hold the writing and object creation device (228), wherein the clamping unit (124) comprises a finger collet (114) with three or more flexible finger positions equispaced within 360 degrees with one or more areas of contact (236A-N) on each finger in front part to grip firmly, wherein each of the three or more flexible finger positions comprises the one or more areas of contact (236A-N), wherein each of the one or more areas of contact (236A-N) comprise a gripping mechanism to hold a corresponding portion of the writing and object creation device (228), wherein the one or more areas of contact (236A-N) comprises a first set of areas of contact and a second set areas of contact and wherein each area of contact of the one or more contacts (236A-N) comprises one or more serrations (302) to provide multiple line contacts for distributing a gripping force across multiple points to grip firmly such that an axial force on the writing and the object creation device (228) is suppressed;
   (b) a spring loaded slider unit (126) comprises a middle housing (106) to transfer a force from the writing and object creation device (228) to a force sensitive resistor (FSR) (206), wherein the middle housing (106) comprises a plunger shaft (216) connected with a preload spring (218), wherein the plunger shaft (216) mounted to the finger collet (114) by a fastener (202); and
   (c) an outer housing unit (128) comprises an outer housing (104) which is configured to hold a micro actuator (102), a plurality of cotter pins (118A-B), a plurality of locator pins (122A-B) to the micro actuator (102) and a push pull key (204), wherein the micro actuator (102) induces a required force to the writing and object creation device (228) based on feedback from the force sensitive resistor (FSR) (206).

2. The robotic gripper (100) as claimed in claim 1, wherein the first set of areas of contact grips at anterior portion of the writing and object creation device (228) to form a first area of contact, wherein the second set of areas of contact grips at posterior side to form a second area of contact.

3. The robotic gripper (100) as claimed in claim 1, wherein at end of the finger an entry feature (304) is provided for smooth entry and insertion for varying diameter range of the writing and object creation device (228).

4. The robotic gripper (100) as claimed in claim 1, wherein a taper clamp (224) comprises a slot opening (404) for the finger collet (114) is coupled with an anti-rotation protrusion (308) to enable sliding between the taper clamp (224) and the finger collet (114) for preventing anti-rotation.

5. The robotic gripper (100) as claimed in claim 1, wherein the taper clamp (224) comprise a concave internal tapered surface (402) is contacting with a taper surface (406) to enable collapsing or expansion of the fingers of the finger collet (114) to grip or release the writing and object creation device (228) respectively.

6. The robotic gripper (100) as claimed in claim 1, wherein three or more additional flat screw (212) are equispaced in 360 degrees and passed through the plunger shaft (216) until each of the additional flat screw (212) touches surface of the writing and object creation device (228) to resist flexing of the writing and object creation device (228).

7. The robotic gripper (100) as claimed in claim 1, wherein three or more additional rounded screw (210) are equispaced in 360 degrees and passed through the outer housing (104) until each of the additional rounded screw (210) touches surface of the writing and object creation device (228) to resist flexing of the writing and object creation device (228).

8. The robotic gripper (100) as claimed in claim 1, wherein the plunger shaft (216) comprises a pop out spring (220) with an end plate (234) integral at one end of spring, wherein the pop out spring (220) comprises a force spring with free length and minimal solid length to enable seating of the writing and object creation device (228).

9. The robotic gripper (100) as claimed in claim 1, wherein the plunger shaft (216) is coupled with the middle housing (106) by an anti-rotation diamond pin (226) to prevent a rotation, wherein the anti-rotation diamond pin (226) is in a close proximity to center axis of the robot gripper (100) to reduce overall size.

10. The robotic gripper (100) as claimed in claim 1, wherein the plunger shaft (216) and the middle housing (106) are coupled to create a space for reducing abrupt shock loads while the writing or the objection creation operation is performed by the writing and object creation device (228).

11. The robotic gripper (100) as claimed in claim 1, wherein a spring housing (214) sandwiched between the preload spring (218) and the force sensitive resistor (FSR) (206) to detect variation in axial force of the writing and object creation device (228) and providing feedback to the micro actuator (102).

12. The robotic gripper (100) as claimed in claim 1, wherein the push pull key (204) mounted to the middle housing (106) and coupled with a key slot (232) of the outer housing (104) to ensure a sliding movement between the outer housing unit (128) and the middle housing (106).

13. The robotic gripper (100) as claimed in claim 1, wherein the push pull key (204) is coupled between the middle housing (106) and the micro actuator (102) to induce a required force without moving a robotic arm (704) in perpendicular direction for the writing or the objection creation operation.

\* \* \* \* \*